US009967290B2

(12) United States Patent
Osterweil et al.

(10) Patent No.: US 9,967,290 B2
(45) Date of Patent: May 8, 2018

(54) SYSTEMS AND METHODS FOR AUTOMATING CLIENT-SIDE DISCOVERY OF PUBLIC KEYS OF EXTERNAL CONTACTS THAT ARE SECURED BY DANE USING DNSSEC

(71) Applicant: VERISIGN, INC., Reston, VA (US)

(72) Inventors: Eric Osterweil, Fairfax, VA (US); Sameer Thakar, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 124 days.

(21) Appl. No.: 15/075,506

(22) Filed: Mar. 21, 2016

(65) Prior Publication Data

US 2017/0272467 A1    Sep. 21, 2017

(51) Int. Cl.
| | | |
|---|---|---|
| *H04L 29/06* | (2006.01) | |
| *H04L 9/32* | (2006.01) | |
| *H04L 29/12* | (2006.01) | |
| *H04L 9/08* | (2006.01) | |
| *H04L 12/58* | (2006.01) | |

(52) U.S. Cl.
CPC ............ *H04L 63/20* (2013.01); *H04L 9/0819* (2013.01); *H04L 9/3247* (2013.01); *H04L 51/00* (2013.01); *H04L 61/1511* (2013.01); *H04L 63/0428* (2013.01); *H04L 63/0435* (2013.01); *H04L 63/0442* (2013.01); *H04L 63/06* (2013.01); *H04L 63/061* (2013.01); *H04L 63/062* (2013.01); *H04L 63/08* (2013.01)

(58) Field of Classification Search
CPC ....... H04L 63/08; H04L 63/20; H04L 63/061; H04L 63/0435; H04L 63/0428; H04L 9/3247
See application file for complete search history.

(56) References Cited

U.S. PATENT DOCUMENTS

2013/0268607 A1 * 10/2013 Brown ................. G06Q 10/107
709/206
2014/0244998 A1    8/2014 Amenedo et al.

OTHER PUBLICATIONS

P. Hoffman et al., "Using Secure DNS to Associate Certificates with Domain Names for S/MIME", Internet Engineering Task Force (IETF), Feb. 24, 2016, pp. 1-6.
Extended European Search Report dated Aug. 8, 2017, European Application No. 17161188.2, pp. 1-9.

* cited by examiner

*Primary Examiner* — Beemnet Dada
(74) *Attorney, Agent, or Firm* — MH2 Technology Law Group, LLP

(57) ABSTRACT

Provided is a method of digitally securing a digital object from a first user in a first domain to a second user in a second domain using a DNS provider. The method includes accessing, at a client device of the first user, a client-side local policy, wherein the local policy comprises one or more zones managed by one or more DNS providers and secured by DANE using DNSSEC; constructing a DNS query for a cryptographic credential for the second user based, at least in part, on a zone of the one or more zones in the local policy; providing a request for the cryptographic credential for the second user; obtaining the cryptographic credential for the second user from a DNS provider of the one or more DNS providers; digitally securing the digital object using the cryptographic credential; and providing the digital object to the second user.

21 Claims, 8 Drawing Sheets

SYSTEMS AND METHODS FOR AUTOMATING CLIENT-SIDE DISCOVERY OF PUBLIC KEYS OF EXTERNAL CONTACTS THAT ARE SECURED BY DANE USING DNSSEC

FIELD

The present disclosure relates generally to automating client-side discovery of public keys and certificates of external contacts using domain name system ("DNS")-based authentication of named entities ("DANE") using DNS security extensions ("DNSSEC").

BACKGROUND

Secure (e.g., encrypted and signed) email and document signing and encryption and verification via public key cryptography rely on the use of private and public key pairs. Public keys can include identity keys, or be included in digital or identity certificates. When networked devices want to interact with entities over the Internet via secure email, the networked devices' local key stores must contain the entities' public keys for the networked devices to verify the entities' cryptographic signature or enable encrypted data exchanges with the entities. However, networked devices and their users often encounter difficulties when interacting or exchanging signed and encrypted documents with other entities over the Internet via secure email. For instance, no general adopted means currently exists for the users to discover and obtain public keys required for such secure interactions or data exchanges. Instead, provisioning of sender public keys into a recipient's local key store is currently a manual process not familiar to most users. Even for users that are familiar, the manual process is error prone and usually involves exchanging public keys with the sender over an insecure communication channel via an out-of-band method, thus subjecting "secure" interactions and exchanges to compromise. Moreover, users trust certificates that are signed by any one of many certificate authorities, but certificate authorities are not foolproof and indeed have mistakenly signed unauthorized certificates. DANE, on the other hand, allows the resource holder to directly attest for which certificates they are using.

Thus, there is a need for simple and intuitive approaches for users to discover and obtain public keys required for conducting public key cryptography-based secure interactions or data exchanges.

SUMMARY

According to examples of the present disclosure, a method of digitally securing a digital object from a first user in a first domain to a second user in a second domain using a domain name system ("DNS") provider is provided. The method includes accessing, at a client device of the first user, a client-side local policy, wherein the local policy comprises one or more zones managed by one or more DNS providers and secured by DNS-based authentication of named entities ("DANE") using DNS security extensions ("DNSSEC"); constructing, by at least one hardware processor of the client device, a DNS query for a cryptographic credential for the second user based, at least in part, on a zone of the one or more zones in the local policy; providing, to a DNS provider of the one or more DNS providers through a DNS resolver over a network, a request for the cryptographic credential for the second user; obtaining, over a network, the cryptographic credential for the second user from a DNS provider of the one or more DNS providers; digitally securing, by at least one hardware processor of the client device, the digital object using the cryptographic credential; and providing, by the client device over a network, the digital object that is secured using the cryptographic credential to the second user.

In some examples, the cryptographic credential is a Secure/Multipurpose Internet Mail Extensions ("S/MIME") key or a Pretty Good Privacy ("PGP") key.

In some examples, the cryptographic credential is signed by a DNSSEC key of the DNS provider.

In some examples, the DNSSEC key is a zone signing key ("ZSK") or a key signing key ("KSK") associated with a superzone domain.

In some examples, the ZSK or the KSK is authenticated by the DNS resolver or the client device.

In some examples, the DNS query comprises an identifier of the second user and the providing the request comprises adding a zone suffix to the identifier.

In some examples, the method further includes prior to accessing the local policy, providing a request for the cryptographic credential to a DNS provider; receiving a response comprising the cryptographic credential from the DNS provider; determining, by the hardware processor, that the response is not secured using DNSSEC; and disregarding the cryptographic credential.

In some examples, the first domain is different that the second domain.

In some examples, the digital object comprises a document, an email, or a file.

According to examples of the present disclosure, a non-transitory computer readable medium comprising instructions, that when executed by a hardware processor, performs a method of digitally securing a digital object from a first user in a first domain to a second user in a second domain using a domain name system ("DNS") provider is provided. The method includes accessing a client-side local policy, wherein the local policy comprises one or more zones managed by one or more DNS providers and secured by DNS-based authentication of named entities ("DANE") using DNS security extensions ("DNSSEC"); constructing a DNS query for a cryptographic credential for the second user based, at least in part, on a zone of the one or more zones in the local policy; providing a request for the cryptographic credential for the second user; obtaining the cryptographic credential for the second user from a DNS provider of the one or more DNS providers; digitally securing the digital object using the cryptographic credential; and providing the digital object that is secured using the cryptographic credential to the second user.

According to examples of the present disclosure, a method for obtaining a cryptographic credential using a zone secured by domain name system ("DNS")-based authentication of named entities ("DANE") using DNS security extensions ("DNSSEC") is provided. The method includes obtaining, at a DNS resolver over a network, a request from a first client for a cryptographic credential associated with a second client; providing, by the DNS resolver, the request to a DNS provider; obtaining, from the DNS provider, the cryptographic credential associated with the second client, wherein the cryptographic credential is contained in the zone that is secured using DNSSEC and DANE; verifying, by a hardware processor of the DNS resolver, that the cryptographic credential is authentic; providing, over a network, the cryptographic credential to the first client.

According to examples of the present disclosure, a system is provided that includes at least one hardware processor and a non-transitory computer readable medium storing instructions that when executed by the at least one processor perform a method of digitally securing a digital object from a first user in a first domain to a second user in a second domain using a domain name system ("DNS") provider. The method includes accessing, at a client device of the first user, a client-side local policy, wherein the local policy comprises one or more zones managed by one or more DNS providers and secured by DNS-based authentication of named entities ("DANE") using DNS security extensions ("DNSSEC"); constructing, by at least one hardware processor of the client device, a DNS query for a cryptographic credential for the second user based, at least in part, on a zone of the one or more zones in the local policy; providing, to a DNS provider of the one or more DNS providers through a DNS resolver over a network, a request for the cryptographic credential for the second user; obtaining, over a network, the cryptographic credential for the second user from a DNS provider of the one or more DNS providers; digitally securing, by at least one hardware processor of the client device, the digital object using the cryptographic credential; and providing, by the client device over a network, the digital object that is secured using the cryptographic credential to the second user.

According to examples of the present disclosure, a system is provided that includes at least one hardware processor and a non-transitory computer readable medium storing instructions that when executed by the at least one processor perform a method for obtaining a cryptographic credential using a zone secured by domain name system ("DNS")-based authentication of named entities ("DANE") using DNS security extensions ("DNSSEC") is provided. The method includes obtaining, at a DNS resolver over a network, a request from a first client for a cryptographic credential associated with a second client; providing, by the DNS resolver, the request to a DNS provider; obtaining, from the DNS provider, the cryptographic credential associated with the second client, wherein the cryptographic credential is contained in the zone that is secured using DNSSEC and DANE; verifying, by a hardware processor of the DNS resolver, that the cryptographic credential is authentic; providing, over a network, the cryptographic credential to the first client.

According to examples of the present disclosure, a non-transitory computer readable medium comprising instructions, that when executed by a hardware processor, performs a method for obtaining a cryptographic credential using a zone secured by domain name system ("DNS")-based authentication of named entities ("DANE") using DNS security extensions ("DNSSEC") is provided. The method includes obtaining, at a DNS resolver over a network, a request from a first client for a cryptographic credential associated with a second client; providing, by the DNS resolver, the request to a DNS provider; obtaining, from the DNS provider, the cryptographic credential associated with the second client, wherein the cryptographic credential is contained in the zone that is secured using DNSSEC and DANE; verifying, by a hardware processor of the DNS resolver, that the cryptographic credential is authentic; providing, over a network, the cryptographic credential to the first client.

According to examples of the present disclosure, a method of digitally sending a secure email from a first user in a first domain to a second user in a second domain using a domain name system ("DNS") provider is provided. The method includes accessing, at a client device of the first user, a client-side local policy, wherein the local policy comprises one or more zones managed by one or more DNS providers and secured by DNS-based authentication of named entities ("DANE") using DNS security extensions ("DNSSEC"); constructing, by at least one hardware processor of the client device, a DNS query for a cryptographic credential for the second user based, at least in part, on a zone of the one or more zones in the local policy; providing, to a DNS provider of the one or more DNS providers through a DNS resolver over a network, a request for the cryptographic credential for the second user; obtaining, over a network, the cryptographic credential for the second user from a DNS provider of the one or more DNS providers; and sending, by the client device over a network, the secure email to the second user.

According to examples of the present disclosure, a system is provided that includes at least one hardware processor and a non-transitory computer readable medium storing instructions that when executed by the at least one processor perform a method of digitally sending a secure email from a first user in a first domain to a second user in a second domain using a domain name system ("DNS") provider is provided. The method includes accessing, at a client device of the first user, a client-side local policy, wherein the local policy comprises one or more zones managed by one or more DNS providers and secured by DNS-based authentication of named entities ("DANE") using DNS security extensions ("DNSSEC"); constructing, by at least one hardware processor of the client device, a DNS query for a cryptographic credential for the second user based, at least in part, on a zone of the one or more zones in the local policy; providing, to a DNS provider of the one or more DNS providers through a DNS resolver over a network, a request for the cryptographic credential for the second user; obtaining, over a network, the cryptographic credential for the second user from a DNS provider of the one or more DNS providers; and sending, by the client device over a network, the secure email to the second user.

According to examples of the present disclosure, a non-transitory computer readable medium comprising instructions, that when executed by a hardware processor, performs a method of digitally sending a secure email from a first user in a first domain to a second user in a second domain using a domain name system ("DNS") provider is provided. The method includes accessing, at a client device of the first user, a client-side local policy, wherein the local policy comprises one or more zones managed by one or more DNS providers and secured by DNS-based authentication of named entities ("DANE") using DNS security extensions ("DNSSEC"); constructing, by at least one hardware processor of the client device, a DNS query for a cryptographic credential for the second user based, at least in part, on a zone of the one or more zones in the local policy; providing, to a DNS provider of the one or more DNS providers through a DNS resolver over a network, a request for the cryptographic credential for the second user; obtaining, over a network, the cryptographic credential for the second user from a DNS provider of the one or more DNS providers; and sending, by the client device over a network, the secure email to the second user.

It is to be understood that both the foregoing general description and the following detailed description are exemplary and explanatory only and are not restrictive of the implementations, as claimed.

DETAILED DESCRIPTION

Figure 1:
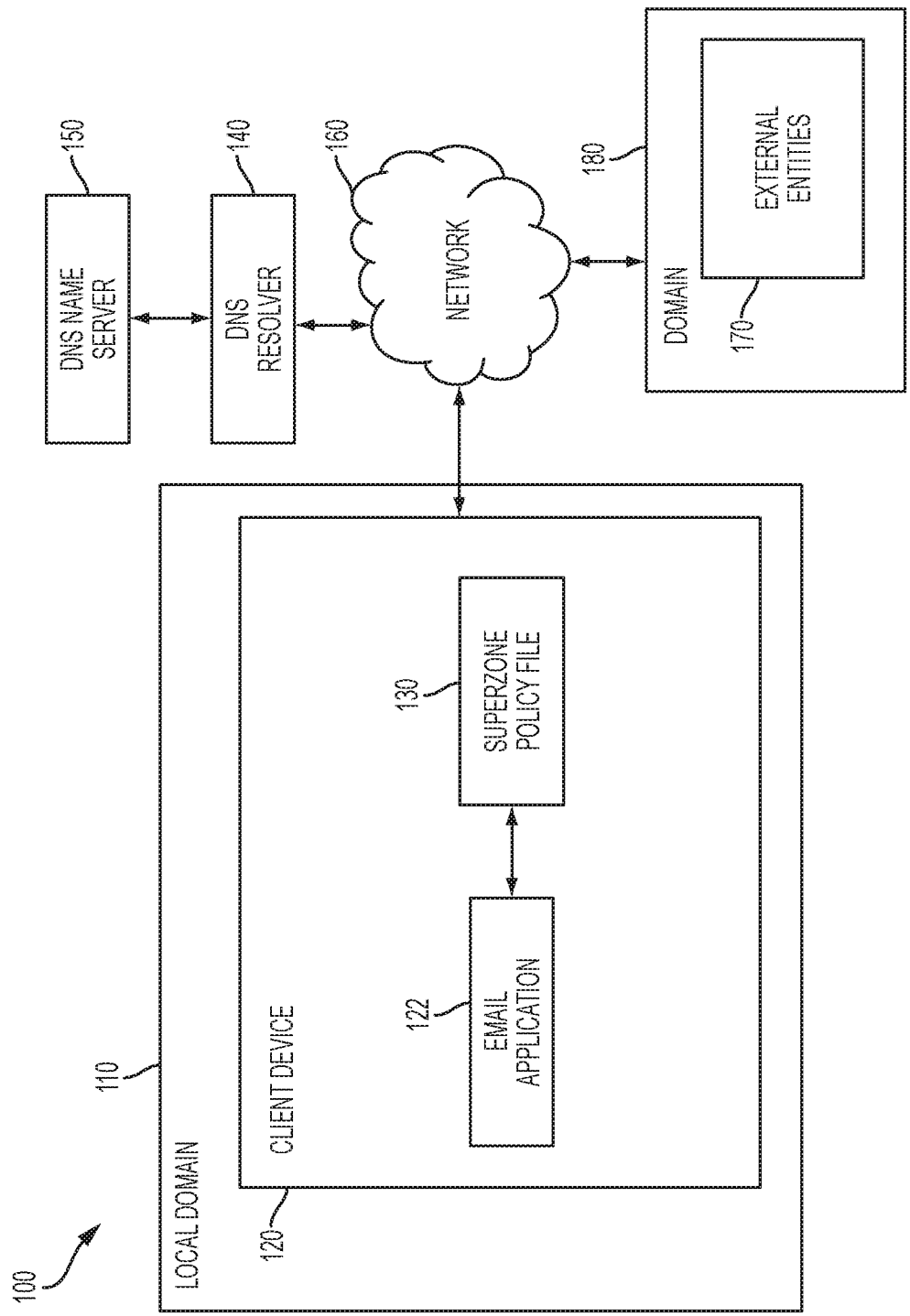
FIG. 1 is a block diagram of an example key discovery system for client-side discovery of public keys and certificates of external contacts, consistent with the principles of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

Generally speaking, when using DANE to securely learn keys for secure email, mail domains must be in DNSSEC signed and verifiable zones. Those inboxes that exist in non-DNSSEC zones (those that either have not deployed DNSSEC correctly, or whose predecessors do not create a secure chain of trust to the mail domain), cannot be verified by DANE technologies, and therefore cannot use DANE for secure email. One aspect of this problem is that email users very often have no control over their DNS zone administration (how can an example.com mail user expect to affect Example-Corp's management of the example.com zone). As such, the present disclosure addresses this problem in a way that allows users of non-DNSSEC verifiable domains to benefit from DANE by allowing mail clients to perform a structured search for a user's mail domain in configured secure mail super-zones. According to some embodiments, clients may add a set of super-zone suffixes to their configuration so that either when a Mail User Agent ("MUA") tries to discover secure mail credentials from DANE at user@example.com, the absence of DNSSEC can allow the client search through a list of super-zones (according to a local policy), for example: user@example.com->user@example.com._super-zone.example.net., or a configuration can precede a lookup with the configured super-zone (i.e., look in user example.com._super-zone.example.net. before user@example.com). A superzone is a DNSSEC signed zone that is used to as a suffix for other zones, such as other non-DNSSEC-enabled zones. For example, for a zone, i.e., example.com, a superzone could be example.com.example.net, where example.net is a secured using DNSSEC and DANE.

According to examples of the present disclosure, a method, system, and computer-readable medium operable to perform the method of digitally securing a digital object from a first user in a first domain to a second user in a second domain using a domain name system ("DNS") provider is provided. The digital object can be, for example, a document, a file, an email, etc. and the digital object can be encrypted and/or digitally signed using a cryptographic digital signature algorithm using a public key that is discoverable in a DNSSEC-secured superzone. While the below description describes an example of sending a secured email between users, the disclosure is not limited in this regard.

FIG. 1 illustrates an example system 100 for sending a secure email from a first user to a second user by using a client-side super-zone policy file ("policy file") at a client device of the first user to securely discovery a cryptographic credential of associated with the second user, consistent with the principles of the present disclosure. For example, the cryptographic credential can be a public key or public key certificate associated with an email account of the second user. The public key can include a Secure/Multipurpose Internet Mail Extensions ("S/MIME") key or a Pretty Good Privacy ("PGP') key, and the like. The cryptographic credential can be stored along with an identifier of an associated user or user's email domain in DNS, where DNS services as a public key registry. The DNS record is stored in a DNS zone or superzone (also called, "super-zone") that is secured using DNSSEC and is discoverable using DANE. For example, a DNS-based public key registry implementing DNSSEC and DANE can store public keys in Secure/Multipurpose Internet Mail Extensions ("SMIME") "A" records ("SMIMEA") under superzone domains corresponding to email addresses of various entities. The DNS-based public key registry can provide Public Key Infrastructure ("PKI") for secure storage and discovery of public keys and/or provide digital signing services using a DNSSEC key, such as either a DNS zone signing key ("ZSK") or a DNS key signing key ("KSK"). Discovery of keys with the DNS-based public key registry greatly encourages the adoption of DNSSEC and DANE, and thus makes the Internet more secure and desirable as a platform for exchanging secure communications and data. Moreover, public keys and certificates stored and cataloged in the DNS-based public key registry can be validated using the DNS.

In various implementations, an example of which is shown in FIG. 1, system 100 includes a local domain 110 in which a client device 105 can operate. System 100 automates the client-side discovery of public keys in a manner transparent to an email application 122 and other client-side applications. System 100 includes a client-side superzone policy 130 that can be implemented, for example, as a file, a look-up table, a script, etc., that can run on client device 120 to obtain one or more superzones from the client device 120 to discover public keys for individual email addresses that can be used with email application 122. External entities 170 can operate in external domains outside of local domain 110, and can be communicatively coupled to client device 120 via at least one network 160. Client device 120 can also be communicatively coupled to a DNS resolver 140 and DNS name server 150. DNS resolver 140 can be a local resolver, a stub resolver, or a recursive resolver (also called recursive name server). If the DNS resolver 140 is a stub resolver, then the DNS resolver 140 may be located on client device 120. Network 160 can include any combination of one or more wired or wireless communication networks, such as a local area network, a near-field communication link or network, a wide area network, a cellular network, the Internet, a cloud-based network, and the like.

Figure 2:
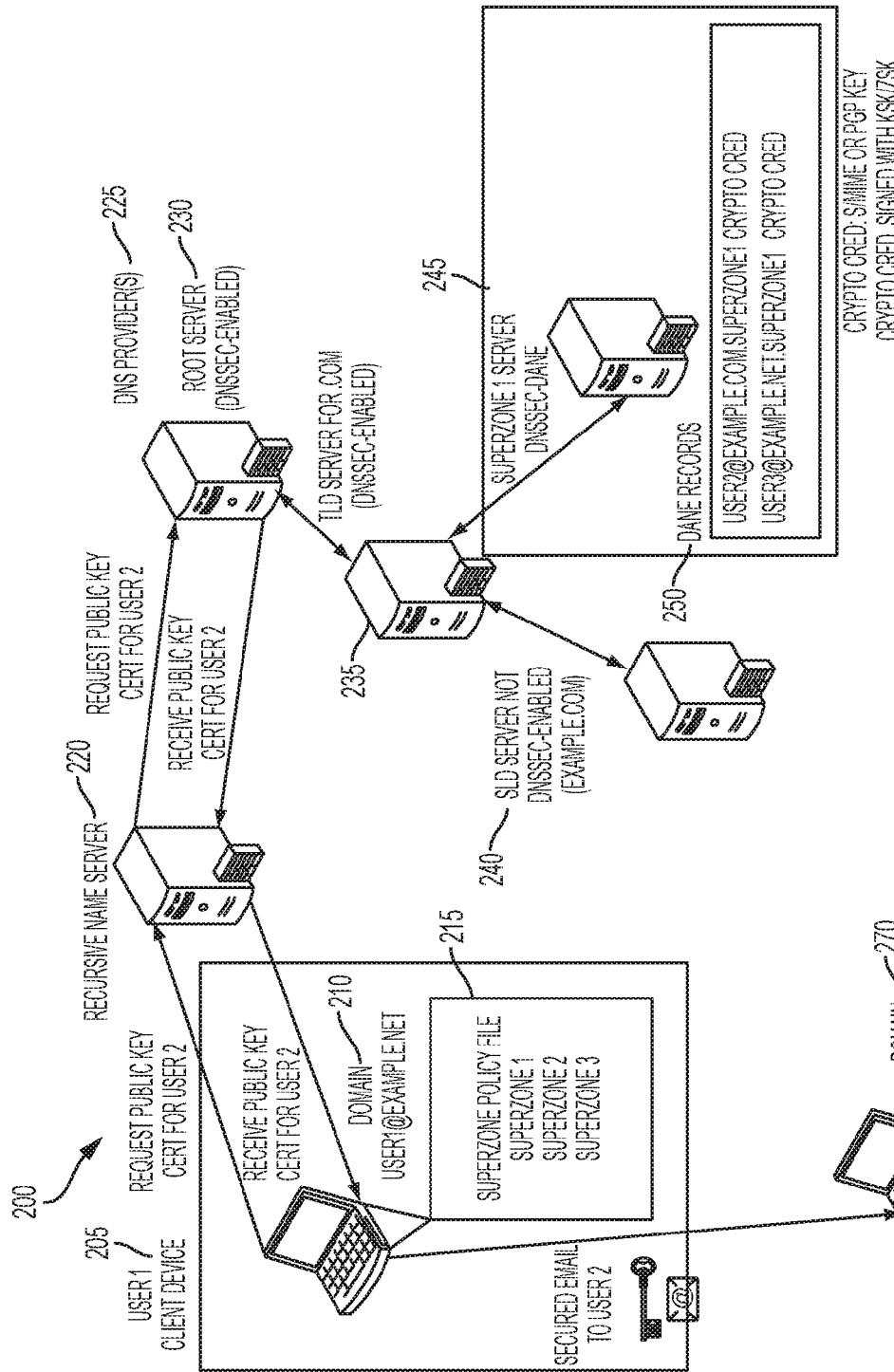
FIG. 2 is a block diagram of an example system for client-side discovery of public keys and certificates of external contacts, consistent with the principles of the present disclosure.
Figure 3A:
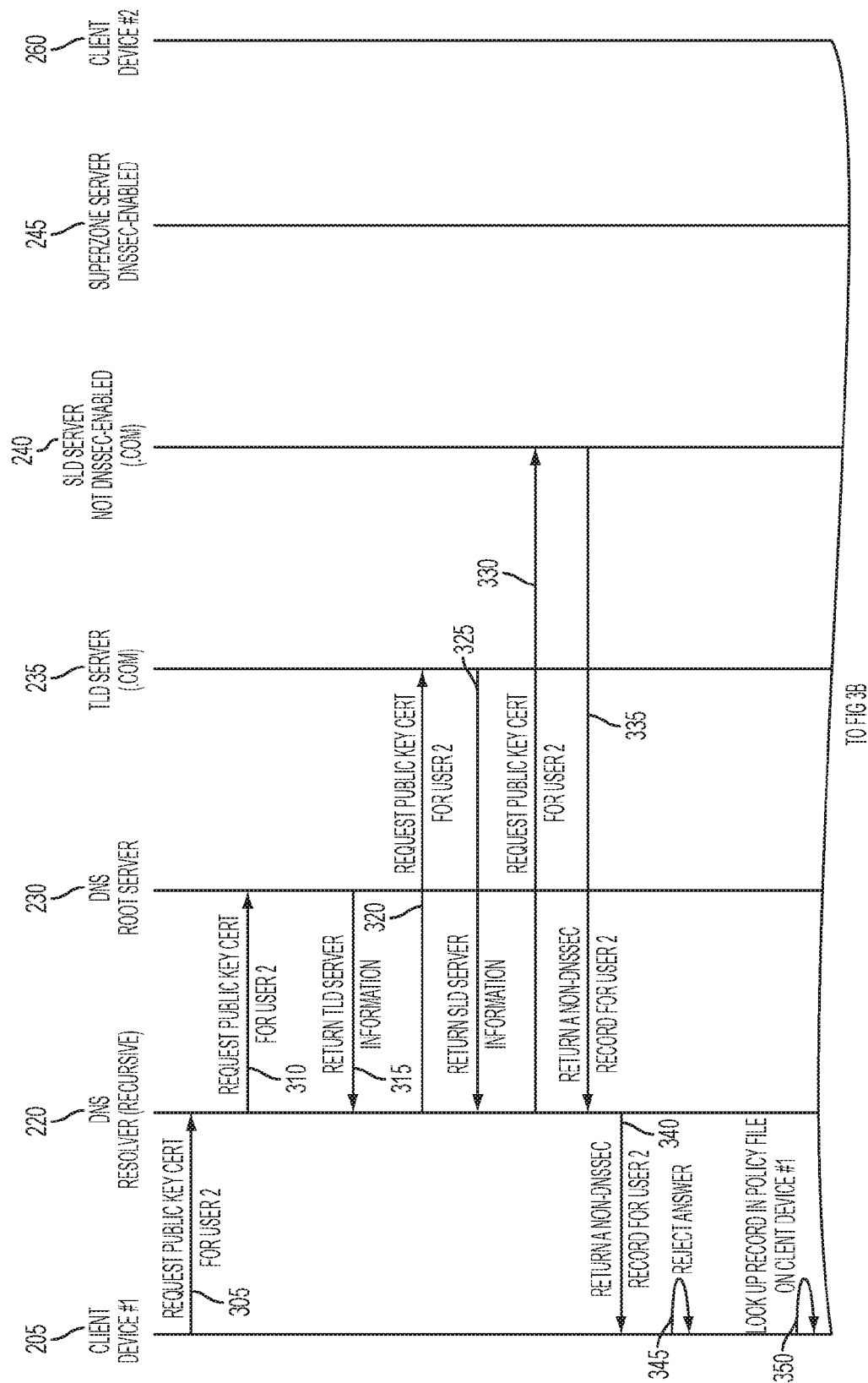
FIGS. 3A and 3B are a transaction diagram of the system of FIG. 2.
Figure 3B:
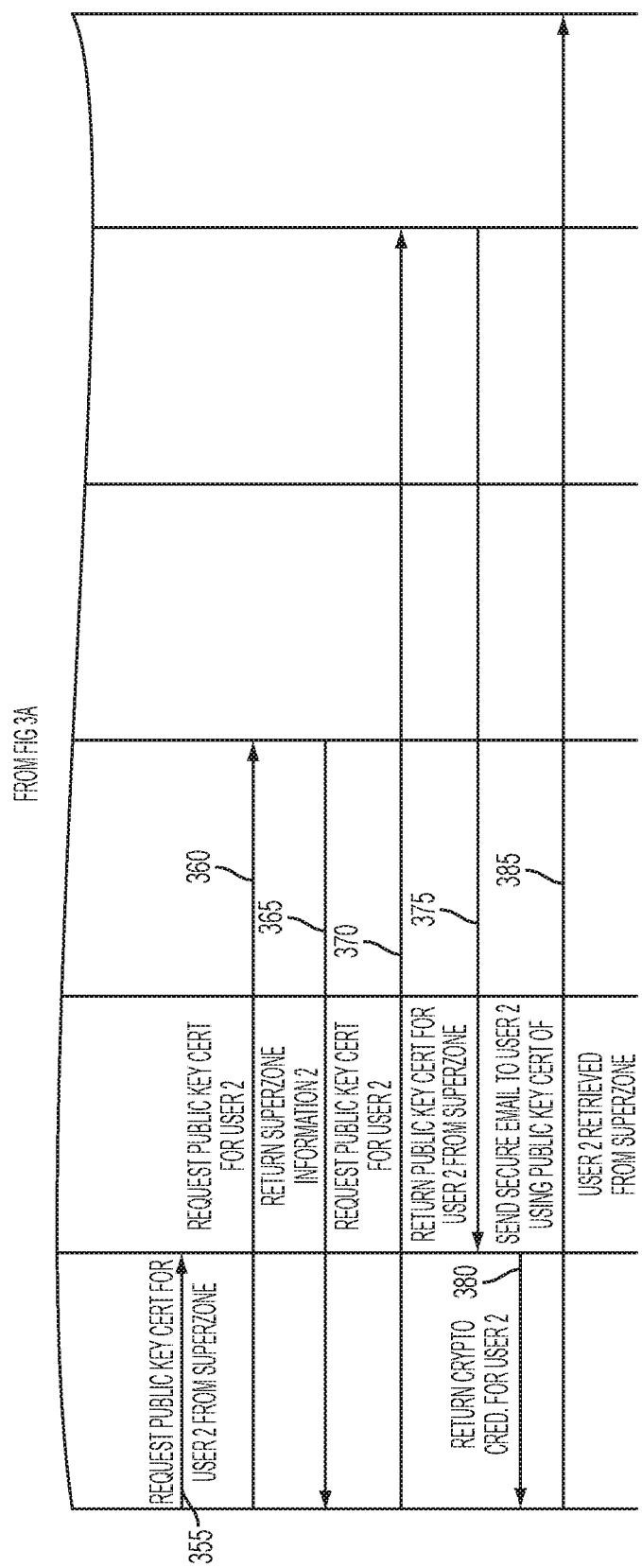

FIG. 2 shows an example system 200 for sending a secure email from user 1 at client device 205 at domain 210, i.e., .net, to user 2 at client device 260 at domain 270, i.e., .com, according to embodiments. FIGS. 3A and 3B, which will be discussed in conjunction with FIG. 2, shows the transactions that occur in the example of FIG. 2. While FIG. 2 shows a secure email example that occurs across domains, client device 205 and client device 260 could be located in the same domain. Superzone policy 215 is stored within client device 205 and contains a record of one or more superzones within DNS that user 1 trusts to be secured using DNS SEC-DANE. As shown, policy 215 includes records for three superzones: superzone 1, superzone2, and superzone3. More or less superzone records can be stored within policy 215. DNS is represented by root server 230, TLD server 235, SLD server 240, all of which can be managed by DNS provider(s) 225, which can be different entities for each server. In this example, the DNS provider 225, such as SLD server 240, has not enabled DNSSEC, while superzone 1 server ("superzone server") 245 has DNSSEC enabled. Superzone server 245 includes one or more DANE records 250 that include a cryptographic credential for each superzone domain listed. The cryptographic credential can be digitally signed with a zone signing key ("ZSK") or a key signing key ("KSK") of the superzone.

In this example, user 1 has an email address user1@example.net and would like to securely send an email to user 2 having the email address user2@example.com. User 1 would like to discover a cryptographic credential through a DNS look-up associated with the email address of user 2 to use to securely send the email. The cryptographic credential can be a public key, such as a S/MIME key or a PGP key. In one example sequence, client device 205, at 305, sends a request for the cryptographic credential to recursive name server 220 for user2@example.com, which is then forwarded to root server 230 that is authoritative for the requested domain, at 310. At 315, root server 230 returns a network location for TLD server 235 responsible for the domain requested, which in this example is .com. At 320, recursive name server 220 sends a request for the cryptographic credential to TLD server 235, which returns a network location of SLD server 240, which in this case is example.com, at 325. At 330, recursive name server 220 sends a request for the cryptographic credential to SLD server 240, which can return non-DNSSEC secured answer at 335. At 340, recursive name server 220 returns the answer received from SLD server 240 to client device 205. At 345, client device 205 determines that the answer received is not DNS SEC-secured and can reject it. At 350, client device 205 performs a look-up in policy 215 for a superzone with which to request a DNSSEC secured credential. At 355, client device 205 sends a request for the cryptographic credential to recursive name server 220 for user2@example.com.superzone1.com, which is then forwarded to superzone 1 server 245 at 360. At 365, superzone 1 server 245 responds to the request with a DNSSEC-secured answer, which can be authenticated by recursive name server 220. At 370, client device 205 request the public key certificate for user 2 from superzone stored on the superzone server 245. At 375, the superzone server 245 can return the cryptographic credential to recursive name server 220. At 380, recursive name server 220 can return the cryptographic credential and user 1 can be use that cryptographic credential to send a secure email to user 2 at 385.

In some examples, policy 215 may be configured to direct client device 205 to perform the actions above for each email request for each intended recipient. Alternatively, policy 215 may be configured such that for selected intended recipients, for example recipients in a domain different than client device 205, policy 215 is consulted first to locate a superzone from which to discovery the cryptographic credential. In this example, client device 205 would start at 350 by performing a look-up in policy 215 to locate a super-zone.

Figure 4:
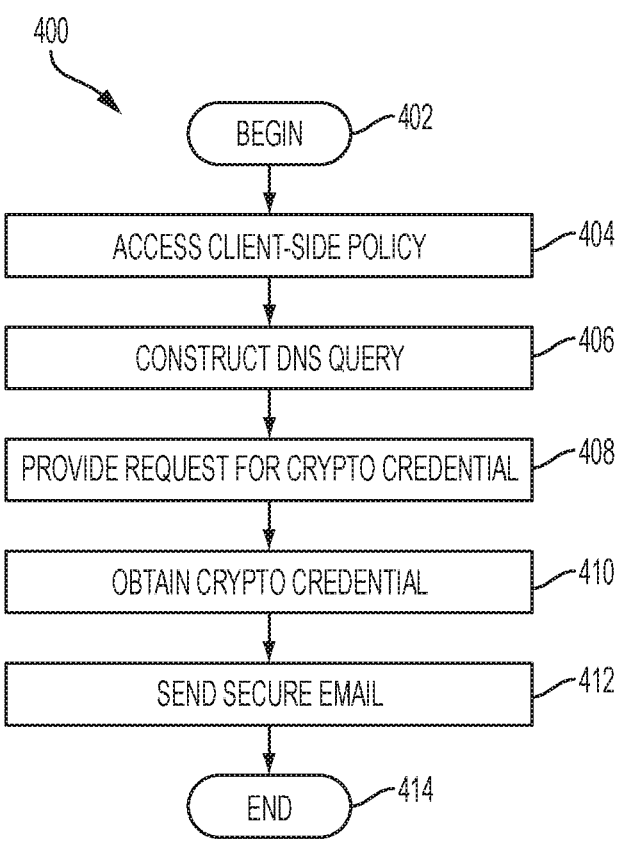
FIG. 4 is an example method of sending a secure email from a first user in a first domain to a second user in a second domain using a DNS provider, according to examples of the present disclosure.

FIG. 4 is an example method 400 of sending a secure email from a first user in a first domain to a second user in a second domain using a DNS provider, according to examples of the present disclosure. The method begins at 402. At 404, client device 120, 205 of the first user accesses a client-side local policy 130, 215. The policy 130, 215 comprises one or more zones managed by one or more DNS providers and secured by DANE using DNSSEC. At 406, client device 120, 205 constructs, by a hardware processor (such as processor 602 of FIG. 6) of client device 120, 205, a DNS query for a cryptographic credential, such as a S/MIME or PGP key, for the second user based, at least in part, on a zone of the one or more zones in look-up table 130, 215. At 408, client device 120, 205 provides, to a DNS provider of the one or more DNS providers 225 through DNS resolver 220 over network 160, a request for the cryptographic credential for the second user. At 410, client device 120, 205 obtains, over network 160, the cryptographic credential for the second user from a DNS provider of the one or more DNS providers 225. At 412, client device 120, 205 can send the secure email to the second user using the cryptographic credential. At 414, the method can end.

Figure 5:
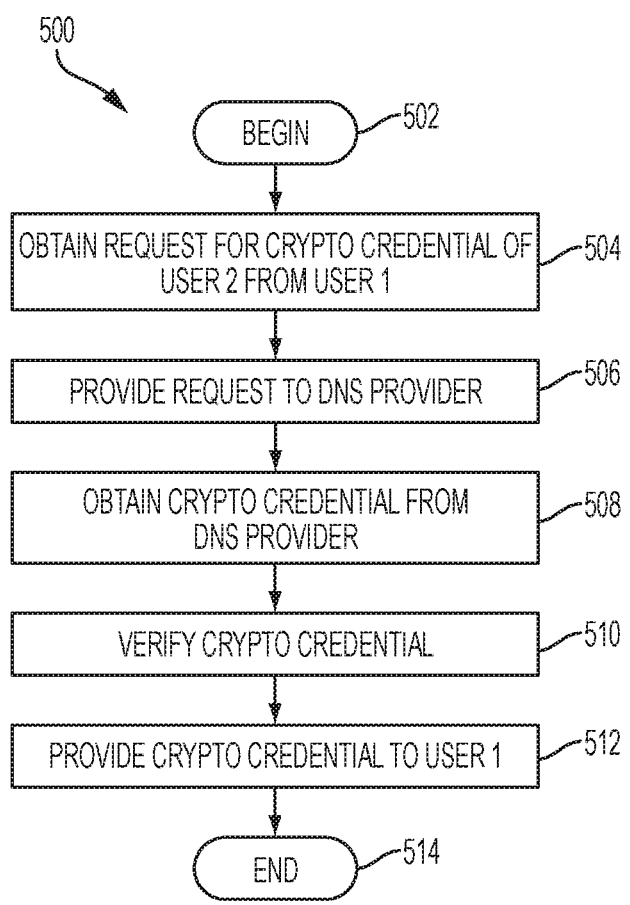
FIG. 5 is an example method for obtaining a cryptographic credential using a zone secured by DANE and DNSSEC, according to examples of the present disclosure.

FIG. 5 is an example method 500 for obtaining a cryptographic credential using a zone secured by DANE using DNSSEC, according to examples of the present disclosure. The method begins at 502. At 504, DNS resolver 140, 220 obtains, over network 160, a request from first client 120, 205 for a cryptographic credential, for example a S/MIME or PGP key, associated with a second client. At 506, DNS resolver 140, 220 provides the request to a DNS provider, such a DNS name server 150 or root server 230. At 508, DNS resolver 140, 220 obtains, from the DNS provider, such as DNS name server 150 or root server 230, the cryptographic credential, associated with the second client, wherein the cryptographic credential is contained in the zone that is secured using DNSSEC and DANE. At 510, DNS resolver 140, 220 verifies, by a hardware processor (such as processor 602 of FIG. 6) of the DNS resolver 140, 220, that the cryptographic credential is authentic using DNSSEC. At 512, DNS resolver 140, 220 provides, over network 160, the cryptographic credential to first client 120. At 514, the method can end.

Figure 6:
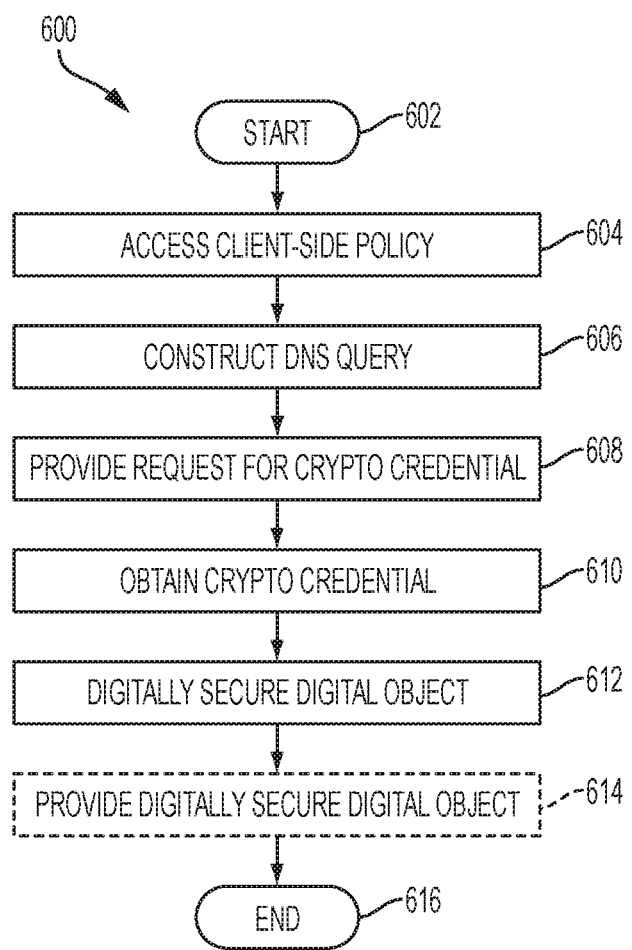
FIG. 6 is an example method of digitally securing a digital object from a first user in a first domain to a second user in a second domain using DNS provider.

FIG. 6 is an example method 600 of digitally securing a digital object from a first user in a first domain to a second user in a second domain using DNS provider, according to examples of the present disclosure. The digital document can be, for example, a file, a document, an email, etc. The first domain can be the same or different than the second domain. The method can begin at 602. At 604, the client device of the first user, such a client device 120, 205, can access a client-side local policy. The local policy can comprise one or more zones managed by one or more DNS providers and secured by DANE using DNSSEC. The policy can be a file, a script, a look-up table, etc. Alternatively or additionally, prior to accessing the local policy, the client device can provide a request for the cryptographic credential to a DNS provider, the client device can receiving a response comprising the cryptographic credential from the DNS provider, the client device can determine, using a hardware processor, that the response is not secured using DNSSEC, and the client device can disregard the cryptographic credential.

At 606, a hardware processor of the client device can construct a DNS query for a cryptographic credential for the second user based, at least in part, on a zone of the one or more zones in the local policy. The query or DNS request can comprise an identifier of the second user and the providing the request comprises adding a zone suffix to the identifier. The cryptographic credential can be a S/MIME key or a PGP key. At 608, the client device can provide, to a DNS provider of the one or more DNS providers through a DNS resolver over a network, a request for the cryptographic credential for the second user. At 610, the client device can obtain, over a network, the cryptographic credential for the second user from a DNS provider of the one or more DNS providers. The cryptographic credential can be signed by a DNSSEC key of the DNS provider. The DNSSEC key can be a ZSK or a KSK) associated with a superzone domain. The ZSK or the KSK can be authenticated by the DNS resolver or the client device. At 612, the client device can digitally securing, using a hardware processor of the client device, the digital object using the cryptographic credential. Additionally, or alternatively, at 614; the client device can provide over a network the digital object that is secured using the cryptographic credential to the second user. The method can end at 616.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
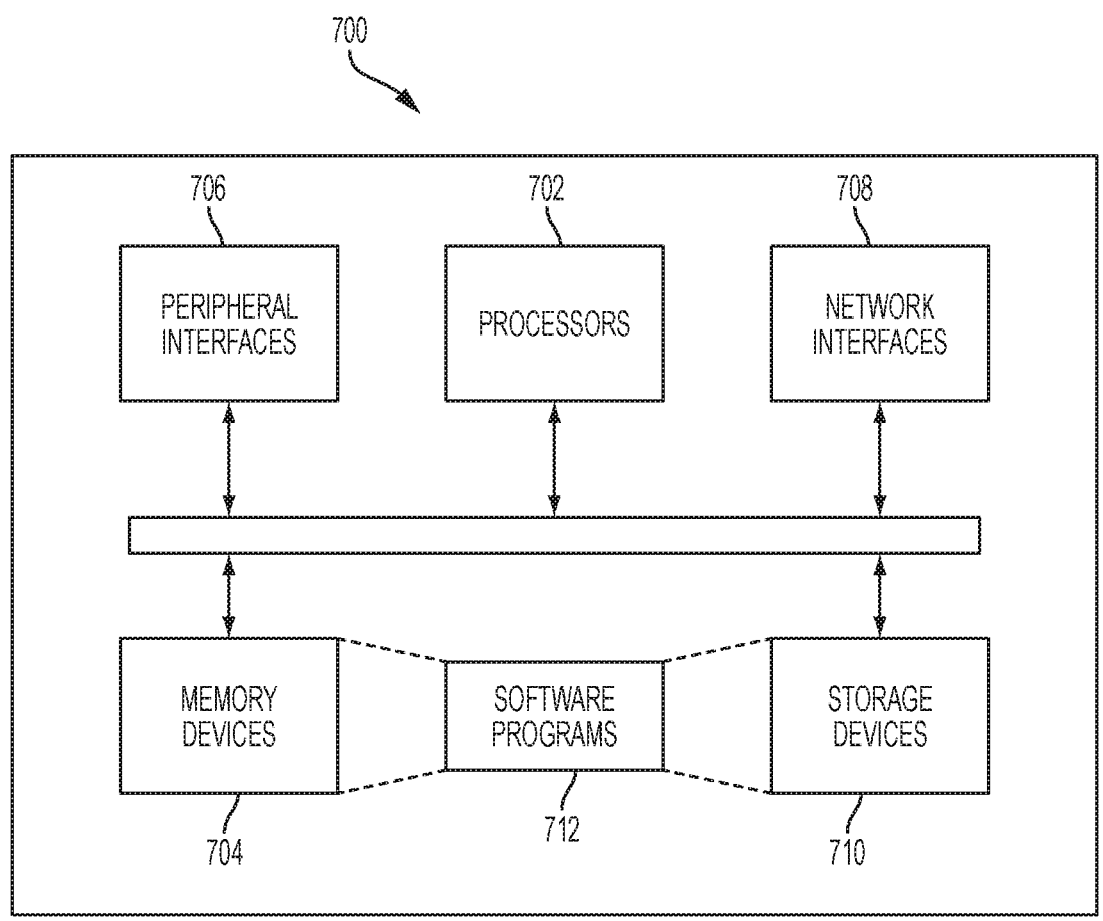
FIG. 7 is an example computer system for performing the disclosed implementations, consistent with the present disclosure.

For example, FIG. 7 illustrates an example of a hardware configuration for a computer device 700 that can be used as mobile device or server, which can be used to perform one or more of the processes described above. While FIG. 7 illustrates various components contained in the computer device 700, FIG. 7 illustrates one example of a computer device and additional components can be added and existing components can be removed.

The computer device 700 can be any type of computer devices, such as desktops, laptops, servers, DNS server, etc., or mobile devices, such as smart telephones, tablet computers, cellular telephones, personal digital assistants, etc. As illustrated in FIG. 7, the computer device 700 can include one or more processors 702 of varying core configurations and clock frequencies. The computer device 700 can also include one or more memory devices 704 that serve as a main memory during the operation of the computer device 700. For example, during operation, a copy of the software that supports the DNS operations can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702.

Additionally, the computer device 700 can include one or more software programs 712 that enable the functionality described above. The one or more software programs 712 can include instructions that cause the one or more processors 702 to perform the processes described herein. Copies of the one or more software programs 712 can be stored in the one or more memory devices 704 and/or on in the one or more storage devices 710. Likewise, the data, for example, the super-zone data, utilized by one or more software programs 712 can be stored in the one or more memory devices 704 and/or on in the one or more storage devices 710.

In implementations, the computer device 700 can communicate with other devices via a network 716. The other devices can be any types of devices as described above. The network 716 can be any type of network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, UDP, OSI, FTP, UPnP, NFS, CIFS, AppleTalk, and the like. The network 716 can be, for example, a local area network, a wide-area network, a virtual private network, the Internet, an intranet, an extranet, a public switched telephone network, an infrared network, a wireless network, and any combination thereof.

The computer device 700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A method of digitally securing a digital object from a first user in a first domain to a second user in a second domain using a domain name system ("DNS") provider, the method comprising:
   accessing, at a client device of the first user, a client-side local policy, wherein the local policy comprises one or more zones managed by one or more DNS providers and secured by DNS-based authentication of named entities ("DANE") using DNS security extensions ("DNSSEC");
   constructing, by at least one hardware processor of the client device, a DNS query for a cryptographic credential for the second user based, at least in part, on a zone of the one or more zones in the local policy;
   providing, to a DNS provider of the one or more DNS providers through a DNS resolver over a network, a request for the cryptographic credential for the second user;
   obtaining, over a network, the cryptographic credential for the second user from a DNS provider of the one or more DNS providers;
   digitally securing, by at least one hardware processor of the client device, the digital object using the cryptographic credential; and
   providing, by the client device over a network, the digital object that is secured using the cryptographic credential to the second user.

2. The method of claim 1, wherein the cryptographic credential is a Secure/Multipurpose Internet Mail Extensions ("S/MIME") key or a Pretty Good Privacy ("PGP") key.

3. The method of claim 1, wherein the cryptographic credential is signed by a DNSSEC key of the DNS provider.

4. The method of claim 3, wherein the DNSSEC key is a zone signing key ("ZSK") or a key signing key ("KSK") associated with a superzone domain.

5. The method of claim 4, wherein the ZSK or the KSK is authenticated by the DNS resolver or the client device.

6. The method of claim 1, wherein the DNS query comprises an identifier of the second user and the providing the request comprises adding a zone suffix to the identifier.

7. The method of claim 1, further comprising:
prior to accessing the local policy, providing a request for the cryptographic credential to a DNS provider;
receiving a response comprising the cryptographic credential from the DNS provider;
determining, by the hardware processor, that the response is not secured using DNSSEC; and
disregarding the cryptographic credential.

8. The method of claim 1, wherein the first domain is different that the second domain.

9. The method of claim 1, wherein the digital object comprises a document, an email, or a file.

10. A non-transitory computer readable medium comprising instructions, that when executed by a hardware processor, performs a method of digitally securing a digital object from a first user in a first domain to a second user in a second domain using a domain name system ("DNS") provider, the method comprising:
accessing a client-side local policy, wherein the local policy comprises one or more zones managed by one or more DNS providers and secured by DNS-based authentication of named entities ("DANE") using DNS security extensions ("DNSSEC");
constructing a DNS query for a cryptographic credential for the second user based, at least in part, on a zone of the one or more zones in the local policy;
providing a request for the cryptographic credential for the second user;
obtaining the cryptographic credential for the second user from a DNS provider of the one or more DNS providers;
digitally securing the digital object using the cryptographic credential; and
providing the digital object that is secured using the cryptographic credential to the second user.

11. The non-transitory computer readable medium of claim 10, wherein the cryptographic credential is a Secure/Multipurpose Internet Mail Extensions ("S/MIME") key or a Pretty Good Privacy ("PGP") key.

12. The non-transitory computer readable medium of claim 10, wherein the cryptographic credential is signed by a DNSSEC key of the DNS provider.

13. The non-transitory computer readable medium of claim 12, wherein the DNSSEC key is a zone signing key ("ZSK") or a key signing key ("KSK") associated with the superzone domain.

14. The non-transitory computer readable medium of claim 10, wherein the first domain is different than the second domain.

15. The non-transitory computer readable medium of claim 10, wherein the digital object comprises a document, an email, or a file.

16. A method for obtaining a cryptographic credential using a zone secured by domain name system ("DNS")-based authentication of named entities ("DANE") using DNS security extensions ("DNSSEC") comprising:
obtaining, at a DNS resolver over a network, a request from a first client for a cryptographic credential associated with a second client;
providing, by the DNS resolver, the request to a DNS provider;
obtaining, from the DNS provider, the cryptographic credential associated with the second client, wherein the cryptographic credential is contained in the zone that is secured using DNSSEC and DANE;
verifying, by a hardware processor of the DNS resolver, that the cryptographic credential is authentic;
providing, over a network, the cryptographic credential to the first client.

17. The method of claim 16, wherein the cryptographic credential is a Secure/Multipurpose Internet Mail Extensions ("S/MIME") key or a Pretty Good Privacy ("PGP') key.

18. The method of claim 16, wherein the cryptographic credential is signed by a DNSSEC key of the DNS provider.

19. The method of claim 18, wherein the DNSSEC key is a zone signing key ("ZSK") or a key signing key ("KSK") associated with the zone.

20. The method of claim 19, wherein verifying the cryptographic credential is authentic comprises verifying that the ZSK or the KSK is authentic.

21. The method of claim 16, wherein the request comprises an identifier of the second user and a zone suffix.

* * * * *